(12) United States Patent
Namba

(10) Patent No.: US 8,123,619 B2
(45) Date of Patent: Feb. 28, 2012

(54) GAME PROGRAM, GAME APPARATUS, AND GAME CONTROL METHOD

(75) Inventor: Kazuhiro Namba, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1103 days.

(21) Appl. No.: 11/961,403

(22) Filed: Dec. 20, 2007

(65) Prior Publication Data

US 2008/0242427 A1    Oct. 2, 2008

(30) Foreign Application Priority Data

Mar. 26, 2007    (JP) ................. 2007-079742

(51) Int. Cl.
*A63F 9/24*    (2006.01)

(52) U.S. Cl. .......................................... 463/43

(58) Field of Classification Search .......... 463/1, 40–43
See application file for complete search history.

(56) References Cited

U.S. PATENT DOCUMENTS

| | | | |
|---|---|---|---|
| 6,299,535 B1 * | 10/2001 | Tanaka | 463/31 |
| 2001/0039212 A1 * | 11/2001 | Sawano et al. | 463/43 |
| 2008/0090659 A1 * | 4/2008 | Aguilar et al. | 463/42 |

FOREIGN PATENT DOCUMENTS

| | | |
|---|---|---|
| JP | 2001-310083 A | 11/2001 |
| JP | 2002-273048 A | 9/2002 |
| JP | 2005-000254 A | 1/2005 |

OTHER PUBLICATIONS

Netrunner, Softbank Publishing Inc.,; Japan; Aug. 1, 2003, vol. 5, No. 8, Whole No. 46, pp. 188 to 189.

* cited by examiner

*Primary Examiner* — David L Lewis
*Assistant Examiner* — Eric M Thomas
(74) *Attorney, Agent, or Firm* — Global IP Counselors, LLP

(57) ABSTRACT

The technical level of a player can be reflected in the results of a game by evaluating the content of the game. In the present game program, when an event execution command for executing an event is issued from the control unit, an event process corresponding to the event execution command is executed by the control unit. When a command for a character during execution of the event is recognized by the control unit, the command for the character is executed by the control unit. The control unit then executes a process for using character evaluation data to evaluate the character that executed the action corresponding to the command. When the control unit executes the process for evaluating the content of the event on the basis of the character evaluation data, the control unit recognizes event content evaluation data that correspond to the evaluation of the event content.

7 Claims, 11 Drawing Sheets

| BATTER EVALUATION | | |
|---|---|---|
| EVALUATION ITEM | | EVALUATION DATA |
| ACTION | BALL CONTACT GOOD | 10 |
| | BALL CONTACT NORMAL | 5 |
| | MISSED SWING/NO SWING | 0 |
| RESULTS | OUTS (1) | -10 |
| | HITS (2) | 30 |
| | DOUBLES (3) | 60 |
| | TRIPLES (4) | 90 |
| | HOME RUNS (5) | 200 |
| | SIMPLE MISSED SWINGS (6) | -1 |
| | STRIKEOUTS (7) RESULTING FROM NO SWING | -20 |
| DEGREE OF CONTRIBUTION | TIES (1) | 100 |
| | OVER .500 (2) | 300 |
| | WALK-OFFS (3) | 700 |

*Fig. 4*

| PITCHER EVALUATION | | |
|---|---|---|
| EVALUATION ITEM | | EVALUATION DATA |
| ACTION | BALL SPEED (140 KM/H OR HIGHER) | 5 |
| | BALL SPEED (LESS THAN 140 KM/H) | 2 |
| | STRIKES | 5 |
| | BALLS | -2 |
| RESULTS | OUTS (1) | 30 |
| | HITS (12) | -10 |
| | DOUBLES (13) | -20 |
| | TRIPLES (14) | -30 |
| | HOME RUNS (15) | -50 |
| | SIMPLE MISSED SWINGS (16) | -200 |
| | STRIKEOUTS (17) RESULTING FROM NO SWING | 50 |
| DEGREE OF CONTRIBUTION | OWN TEAM LOSS | -100 |
| | OTHER TEAM NO-SCORE | 100 |

*Fig. 5*

| PENNANT EVALUATION ||
| --- | --- |
| EVALUATION ITEM | EVALUATION DATA |
| WIN | 10,000 |
| SECOND | 4,000 |
| THIRD | 2,000 |
| FOURTH | 1,000 |
| FIFTH | 500 |
| SIXTH | 0 |

GAME PROGRAM, GAME APPARATUS, AND GAME CONTROL METHOD

CROSS-REFERENCE TO THE RELATED APPLICATIONS

This application claims priority to Japanese Patent Application No. 2007-079742. The entire disclosure of Japanese Patent Application No. 2007-079742 is hereby incorporated herein by reference.

BACKGROUND OF THE INVENTION

1. Field of the Invention

The present invention relates to a game program capable of executing a game. The present invention also relates to a game apparatus capable of executing a game that is implemented by the game program, and to a game control method for controlling the game implemented by the game program through the use of a computer.

2. Description of the Related Art

Various games have been proposed in the past. These games are configured so as to be executed in a game apparatus. For example, a common game apparatus has a monitor, a game console that is separate from the monitor, and an input unit, e.g., a controller, that is separate from the game console. A plurality of input keys is arranged in the controller.

In such a game apparatus, when a game such as one in which game results are reflected in a ranking table is executed, a score or number of wins is generally used as an indicator for determining the ranking (see Pro Baseball Spirits 3, Konami Digital Entertainment, PS2 edition, Apr. 6, 2006). Specifically, the rank improves when the score or number of wins is good. Therefore, a player must acquire a higher score or number of wins in order to improve his or her ranking.

When a player is attempting to acquire a higher score or number of wins, the player often selects general methods that include a method for acquiring a score or number of wins by enhancing the technique level, or a method for steadily acquiring a score or number of wins while maintaining a normal technique level. Among these two methods, the method for acquiring a score or number of wins by enhancing the technique level has an advantage in that the score or number of wins can be acquired while the player enjoys the game itself in spite of high risk. On the other hand, when the player selects the method for steadily acquiring a score or number of wins while maintaining the normal technique level, the score or number of wins can be acquired at a low risk.

SUMMARY OF THE INVENTION

In a conventional game, when a player wishes to acquire a high score or number of wins in order to improve his or her ranking, the player often selects a method for acquiring a score or number of wins by enhancing the technique level, or a method for steadily acquiring a score or number of wins while maintaining a normal technique level. Although the score or number of wins can be acquired by both of these two methods, the methods differ in that the score or number of wins is acquired either while playing at a high difficulty level, or while playing at the normal difficulty level. However, when the goal is only to improve one's own ranking, the method for steadily acquiring the score or number of wins while maintaining the normal technique level has low risk, and is therefore more often selected by the player. Therefore, although the game provider enables various functions to be implemented by the game, non-basic functions are no longer utilized by the player, and the game content becomes monotonous. This problem is caused by the fact that no evaluation of game content takes place in a conventional game, and the player is therefore not presented with a need to use functions other than the basic functions.

An object of the present invention is to enable the technical level of a player to be reflected in the results of a game by evaluating the content of the game.

Means for Solving These Problems

The game program according to a first aspect is a program for implementing the following functions in a computer that is capable of executing a game.

(1) A command recognition function makes the control unit to recognize a event execution command corresponding to the character during the event execution.

(2) An event execution function makes the control unit to execute an event process that corresponds to the event execution command for executing an event, when the event execution command is issued from the control unit.

(3) A command execution function makes the control unit to execute the event execution command for the character.

(4) A character evaluation function makes the control unit to execute a process to evaluate the character that has executed the event corresponding to the event execution command by using character evaluation data.

(5) An event content evaluation data recognition function makes the control unit to recognize event content evaluation data that correspond to an evaluation of the event content, by making the control unit to execute a process to evaluate the event content on the basis of the character evaluation data, and makes the control unit to generate event content evaluation data that are an evaluation of the content.

In the game program, the event process corresponding to the event execution command is executed by the control unit in the event execution function, when an event execution command for executing an event is issued from the control unit. In the command recognition function, a command for a character during event execution is recognized by the control unit. In the command execution function, the command for the character is executed by the control unit. In the character evaluation function, a process for using character evaluation data to evaluate the character that executed the event corresponding to the command is executed by the control unit. In the event content evaluation data recognition function, a process for evaluating the event content on the basis of the character evaluation data is executed by the control unit, whereby event content evaluation data that correspond to an evaluation of the event content are recognized by the control unit.

For example, when the present game program is used to implement a baseball game, an event process that corresponds to an event execution command is executed by the control unit, when an event execution command for executing an event in the baseball game is issued from the control unit. During event execution, a command for a player character is executed by the control unit when a command for the player character is recognized by the control unit. The control unit then executes a process for using player character evaluation data to evaluate the player character that executed the event corresponding to the command. A process for evaluating the event content on the basis of the character evaluation data is then executed by the control unit, whereby event content evaluation data that correspond to an evaluation of the event content are recognized by the control unit.

In this case, various events such as hit events, pitch events, fielding events, base running events, and the like can be executed in the baseball game. Commands relating to hitting, commands relating to pitching, commands related to fielding, commands related to base running, and the like can also be executed for a player character. The content of an event can be evaluated for a player character on the basis of an evaluation with respect to the player character when a command relating to a hit, a command relating to a pitch, a command relating to fielding, a command relating to base running, or the like is performed. Since an evaluation with respect to the player character when an instruction for the player character is performed is reflected in the evaluation of the event content according to the first aspect of the present invention, the technical level of the player can be reflected in the result of the game by using the evaluation of the event content to evaluate the results of the game.

The game program according to a second aspect is the game program according to the first aspect, wherein the program causes a computer to furthermore implement the following functions.

(6) An event evaluation function makes the control unit to execute a process to evaluate results of a plurality of the events by using event evaluation data for the events.

(7) An all-event results evaluation data recognition function makes the control unit to recognize all-event results evaluation data that correspond to an evaluation of the results of all the events by causing the control unit to execute a process for evaluating the results of all events on the basis of the event evaluation data for the plurality of the events.

(8) A general evaluation function makes the control unit to execute a process for performing a general evaluation of the event content and the results of all events, on the basis of the event content evaluation data and the all-event results evaluation data.

In this game program, a process for evaluating results of a plurality of the events by using a event evaluation data for a plurality of the events is executed by the control unit in the event evaluation function. In the all-event results evaluation data recognition function, a process for evaluating the results of all events on the basis of the event evaluation data for the plurality of the events is executed by the control unit, whereby all-event results evaluation data that correspond to an evaluation of the results of all the events are recognized by the control unit. In the general evaluation function, a process for performing a general evaluation of the event content and the results of all events on the basis of the event content evaluation data and the all-event results evaluation data is executed by the control unit.

For example, when the present game program is used to implement a baseball game, the control unit executes a process for using a event evaluation data for a plurality of the events to evaluate the results of a plurality of events in the baseball game. The control unit then executes a process for evaluating the results of all events on the basis of the event evaluation data for the plurality of the events, whereby all-event results evaluation data corresponding to the evaluation of the results of all events are recognized by the control unit. A process for performing a general evaluation of the event content and the results of all events on the basis of the event content evaluation data and the all-event results evaluation data is then executed by the control unit.

In this case, it is possible to evaluate the outcomes of matches, rankings in a pennant race, outcomes in the Japan Series, and the like in the baseball game. It is also possible to evaluate all of the results of the outcomes of matches, rankings in a pennant race, outcomes in the Japan Series, and the like. It is also possible to perform a general evaluation of the content of events and the results of all events that include the outcomes of matches, rankings in a pennant race, outcomes in the Japan Series, and the like in which the evaluation for the player character is reflected. In the second aspect thus configured, it is possible to evaluate not only the content of events, but also the results of all events.

The game program according to a third aspect is the game program according to the first or second aspect, wherein the program causes a computer to furthermore implement the following function.

(9) An event determination function makes the control unit to determine whether the event is appropriate to be evaluated.

In the event determination function in this game program, a determination is made by the control unit as to whether an event is an event to be evaluated. In the character evaluation function, a process is executed by the control unit for evaluating the character that executed the event corresponding to the command by using character evaluation data when the control unit determines that the event is an event to be evaluated.

In this case, the character that executed the event corresponding to the command is evaluated using character evaluation data when the event is an event to be evaluated. In other words, when the event is a prescribed event, the character that executed the event corresponding to the command is evaluated using character evaluation data. In the third aspect thus configured, the load placed on the computer, e.g., the control unit or a memory unit, can be reduced in comparison to a case in which the evaluation for the character is executed in real time.

The game program according to a fourth aspect is the game program according to any of the first through third aspects, wherein the program causes a computer to furthermore implement the following function.

(10) A general results display function displays results in which the event content and the results of all events are comprehensively evaluated on the basis of the event content evaluation data and the all-event results evaluation data by using image data that correspond to the results on a monitor.

In the general results display function in this game program, image data that correspond to the results are used to display results in a monitor in which the event content and the results of all events are comprehensively evaluated on the basis of the event content evaluation data and the all-event results evaluation data.

In this case, results in which the event content and the results of all events are comprehensively evaluated can be displayed in a monitor. A player can therefore use the monitor to confirm the general results, e.g., rankings and other results, that include an evaluation with respect to event content.

The game program according to a fifth aspect is a program for implementing the following functions in each of a plurality of computers that is capable of executing a game via a network.

(1) A command recognition function makes the control unit to recognize a event execution command for a character that corresponds to an input operation when an input unit is operated to specify the event execution command for the character during the event execution.

(2) An event execution function makes a control unit to execute an event process that corresponds to an event execution command for executing an event, when the event execution command is issued from the control unit.

(3) A command execution function makes the control unit to execute the command for the character.

(4) A character evaluation function makes the control unit to execute a process to evaluate the character that has executed the event corresponding to the command by using character evaluation data.

(5) An event content evaluation data recognition function makes the control unit to recognize event content evaluation data that correspond to an evaluation of the event content by making the control unit to execute a process to evaluate the event content on the basis of the character evaluation data.

In this game program, the following functions are implemented in each of a plurality of computers that is capable of executing a game via a network. In the event execution function, the event process corresponding to the event execution command is executed by the control unit of a computer when an event execution command for executing an event is issued from the control unit of the computer. In the command recognition function, command for a character that corresponds to an input operation is recognized by the control unit when an input unit is operated to specify a command for the character during the event execution. In the command execution function, the command for the character is executed by the control unit. In the character evaluation function, a process for evaluating the character that executed the event corresponding to the command is executed by the control unit. In the character evaluation data recognition function, character evaluation data that correspond to processing results in which the character is evaluated are recognized by the control unit. In the event content evaluation data recognition function, a process for evaluating the event content on the basis of the character evaluation data is executed by the control unit, whereby event content evaluation data that corresponds to an evaluation of the event content is recognized.

In at least one such computer of the plurality of computers capable of executing a game via a network, a process for transmitting a signal corresponding to the command for the character from at least any one computer to another computer among the plurality of computers in order to specify a command for a character during the event execution, is executed by the control unit of the at least any one computer. In the other computer that is executing the same event as the at least any one computer among the plurality of computers, the command for the character in the at least any one computer is thereby recognized by the control unit of the other computer of the plurality of computers. The command for the character is also executed by the control unit of the other computer.

In the fifth aspect thus configured, when a plurality of computers is connected to each other via a network, and a command for a character is specified in a certain computer, the same command that was specified in the certain computer is also specified for the character of another computer. A match game, for example, can thereby be executed in a plurality of computers connected to each other via a network. Event content can also be evaluated in each other plurality of computers that is executing the match game. The technical level of the players operating each computer can therefore be made to reflect the results of the game by using the evaluation of event content to evaluate the game results.

A game can be executed by the game apparatus according to a sixth aspect. This game apparatus includes event execution means for causing a control unit to execute an event process that corresponds to an event execution command for executing an event, when the event execution command is issued from the control unit; command recognition means for causing the control unit to recognize a command for the character during the event execution; command execution means for causing the control unit to execute the command for the character; character evaluation means for causing the control unit to execute a process for using character evaluation data to evaluate the character that executed the event corresponding to the command; and event content evaluation data recognition means for causing the control unit to recognize event content evaluation data that correspond to an evaluation of the event content by causing the control unit to execute a process for evaluating the event content on the basis of the character evaluation data.

A game can be controlled by a computer according to the game control method of a seventh aspect. This game control method includes an event execution step for causing a control unit to execute an event process that corresponds to an event execution command for executing an event, when the event execution command is issued from the control unit; a command recognition step for causing the control unit to recognize a command for the character during the event execution; a command execution step for causing the control unit to execute the command for the character; a character evaluation step for causing the control unit to execute a process for using character evaluation data to evaluate the character that executed the event corresponding to the command; and an event content evaluation data recognition step for causing the control unit to recognize event content evaluation data that correspond to an evaluation of the event content by causing the control unit to execute a process for evaluating the event content on the basis of the character evaluation data.

According to the present invention, the content of an event can be evaluated based on an evaluation with respect to a player character when various types of instructions are issued for the character during an event. According to the present invention, since an evaluation for the character when an instruction is issued for the character is reflected in the evaluation of the event content, the event content can be used to evaluate the results of the game, whereby the technical level of the player can be reflected in the results of the game.

BRIEF DESCRIPTION OF THE DRAWINGS

Referring now to the attached drawings which form a part of this original disclosure.

FIG. 4 is a diagram showing an association table for evaluating a batting character.

FIG. 5 is a diagram showing an association table for evaluating a pitching character.

DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration and Operation of the Game Apparatus

Figure 1:
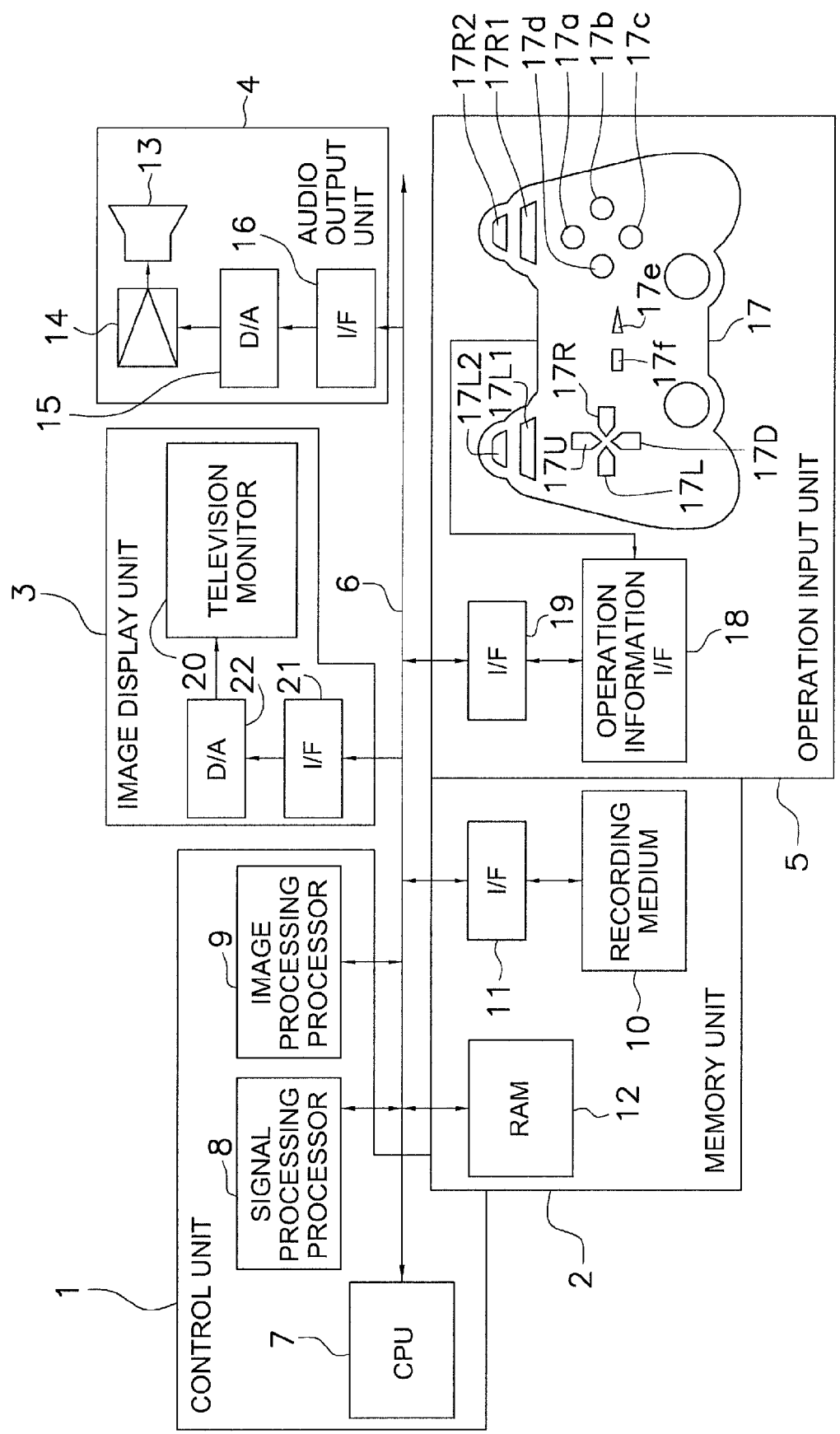
FIG. 1 is a basic structural diagram showing the video game apparatus according to Embodiment 1 of the present invention.

FIG. 1 shows the basic structure of the game apparatus according to Embodiment 1 of the present invention. A home video game apparatus is described below as an example of the video game apparatus. The home video game apparatus is provided with a home game machine main body and a home television. A recording medium 10 can be mounted in the home game machine main body, and game data is read as needed from the recording medium 10 to execute the game. In this manner, the executed game content is displayed on the home television.

The game system of the home video game apparatus is composed of a control unit 1, a memory unit 2, an image display unit 3, an audio output unit 4, and an operation input unit 5, and each of these are connected via a bus 6. The bus 6 includes an address bus, a data bus, a control bus, and the like. In this case, the control unit 1, memory unit 2, audio output unit 4, and operation input unit 5 are included in the home game machine main body of the home video game apparatus, and the image display unit 3 is included in the home television.

The control unit 1 is provided primarily for controlling the progress of the game as a whole on the basis of a game program. The control unit 1 is composed, for example, of a CPU (Central Processing Unit) 7, a signal processing processor 8, and an image processing processor 9. The CPU 7, the signal processing processor 8, and the image processing processor 9 are connected to each other via the bus 6. The CPU 7 interprets commands from the game program and performs various types of data processing or control. For example, the CPU 7 issues a command to the signal processing processor 8 to feed image data to the image processing processor. The signal processing processor 8 primarily performs calculations in three-dimensional space, positional conversion calculations from three-dimensional space to pseudo-three-dimensional space, light source calculation processing, and processing for generating and processing images and audio data based on the results of calculations executed in three-dimensional space or pseudo-three-dimensional space. The image processing processor 9 primarily performs processing for writing image data to be drawn into RAM 12 on the basis of the calculation results and processing results of the signal processing processor 8. The CPU 7 issues commands to the signal processing processor 8 to process various types of data. The signal processing processor 8 primarily performs calculations corresponding to various types of data in three-dimensional space, and position conversion calculations from three-dimensional space to pseudo-three-dimensional space.

The memory unit 2 is provided primarily for storing program data or various types of data and the like used by the program data. The memory unit 2 is composed, for example, of a recording medium 10, an interface circuit 11, and RAM (Random Access Memory) 12. The interface circuit 11 is connected to the recording medium 10. The interface circuit 11 and the RAM 12 are connected via the bus 6. The recording medium 10 is provided for storing program data of the operation system, or game data and the like composed of image data, audio data, and various types of program data. The recording medium 10 is a ROM (Read Only Memory) cassette, an optical disk, a flexible disk, or the like, for example, and stores operating system program data, game data, or the like. Card-type memory is also included in the recording medium 10, and the card-type memory is used primarily for storing various types of game parameters at the time of interruption when a game is interrupted. The RAM 12 temporarily stores various types of data that are read from the recording medium 10, and is used for such purposes as temporarily storing processing results from the control unit 1. Various types of data, and address data for indicating the storage position of the various types of data are stored in the RAM 12, and an arbitrary address can be specified for reading and writing.

The image display unit 3 is provided primarily for outputting an image of image data that are written in the RAM 12 by the image processing processor 9, image data that are read from the recording medium 10, and the like. The image display unit 3 is composed of a television monitor 20, an interface circuit 21, and a D/A converter (Digital-to-Analog converter) 22, for example. The D/A converter 22 is connected to the television monitor 20, and the interface circuit 21 is connected to the D/A converter 22. The bus 6 is connected to the interface circuit 21. In this arrangement, the image data are fed to the D/A converter 22 via the interface circuit 21 and converted to analog image signals. The analog image signals are outputted as an image to the television monitor 20.

In this case, the image data include polygon data, texture data, and the like, for example. Polygon data are coordinate data of the vertexes that constitute a polygon. Texture data are data for setting textures on the polygons, and are composed of texture instruction data and texture color data. The texture instruction data are data for correlating a polygon with a texture, and the texture color data are data for specifying the color of a texture. In this arrangement, polygon address data and texture address data that indicate the storage positions of the data are correlated with each other in the polygon data and the texture data, respectively. In such image data, the signal processing processor 8 performs coordinate conversion and perspective projection conversion of polygon data in three-dimensional space (three-dimensional polygon data) indicated by the polygon address data, and the data are replaced with polygon data in two-dimensional space (two-dimensional polygon data). The external shape of a polygon is formed by a plurality of items of two-dimensional polygon data, and the texture data indicated by the texture address data are written in the internal region of the polygon. Objects in which textures are affixed to polygons, i.e., various types of characters, can thus be displayed.

The audio output unit 4 is provided primarily for outputting sound from audio data that are read from the recording medium 10. The audio output unit 4 is composed of a speaker 13, an amplification circuit 14, a D/A converter 15, and an interface circuit 16, for example. The amplification circuit 14 is connected to the speaker 13, the D/A converter 15 is connected to the amplification circuit 14, and the interface circuit 16 is connected to the D/A converter 15. The bus 6 is connected to the interface circuit 16. In this arrangement, the audio data are fed to the D/A converter 15 via the interface circuit 16 and converted to analog audio signals. The analog audio signals are amplified by the amplification circuit 14 and outputted as sound from the speaker 13. The audio data include ADPCM (Adaptive Differential Pulse Code Modulation) data, PCM (Pulse Code Modulation) data, or the like, for example. In the case of ADPCM data, sound can be outputted from the speaker 13 by the same processing method described above. In the case of PCM data, sound can be outputted from the speaker 13 by the same processing method described above by first converting the PCM data to ADPCM data in the RAM 12.

The operation input unit 5 is primarily composed of a controller 17, an operation information interface circuit 18, and an interface circuit 19. The operation information interface circuit 18 is connected to the controller 17, and the interface circuit 19 is connected to the operation information interface circuit 18. The bus 6 is connected to the interface circuit 19.

The controller 17 is an operation device that is used by the player to input various operating commands, and operating signals that correspond to the operations of the player are transmitted to the CPU 7. The controller 17 is provided with a first button 17a, a second button 17b, a third button 17c, a fourth button 17d, an up key 17U, a down key 17D, a left key 17L, a right key 17R, an L1 button 17L1, an L2 button 17L2, an R1 button 17R1, an R2 button 17R2, a start button 17e, a select button 17f, a left stick 17SL, and a right stick 17SR.

The up key 17U, the down key 17D, the left key 17L, and the right key 17R are used, for example, to present commands to the CPU 7 to move a character or cursor up, down, left, or right on the screen of the television monitor 20.

The start button 17e is used to instruct the CPU 7 to load the game program from the recording medium 10.

The select button 17f is used to specify various selections to the CPU 7 for the game program that is loaded from the recording medium 10.

The left stick 17SL and the right stick 17SR are stick-type controllers having substantially the same structure as a so-called joystick. The stick-type controllers have an upright stick. The stick is configured so as to be capable of tilting from the upright position through 360° of directions that include forward, backward, left, and right with respect to a center support point. The left stick 17SL and the right stick 17SR transmit the values of an x coordinate and a y coordinate as an operation signal using the upright position as the origin according to the tilt direction and tilt angle of the sticks to the CPU 7 via the operation information interface circuit 18 and the interface circuit 19.

Various types of functions are assigned to the first button 17a, the second button 17b, the third button 17c, the fourth button 17d, the L1 button 17L1, the L2 button 17L2, the R1 button 17R1, and the R2 button 17R2 according to the game program that is loaded from the recording medium 10.

The buttons and keys of the controller 17 other than the left stick 17SL and the right stick 17SR are on/off switches that are switched on by being pushed from the center position by outside pressure and switched off by returning to the center position when pressure is withdrawn.

The overall operation of the home video game apparatus configured as described above will next be described. When the power supply switch (not shown) is turned on to supply electrical power to the game system 1, the CPU 7 reads image data, audio data, and program data from the recording medium 10 on the basis of the operating system stored in the recording medium 10. Some or all of the image data, audio data, and program data thus read is stored in the RAM 12. The CPU 7 then issues a command for the image data or audio data stored in the RAM 12 on the basis of the program data that are stored in the RAM 12.

In the case of image data, the signal processing processor 8 first performs position calculations, light source calculations, and the like of a character in three-dimensional space on the basis of the command from the CPU 7. The image processing processor 9 then performs write processing and the like of image data to be drawn into the RAM 12 on the basis of the calculation results of the signal processing processor 8. The image data written in the RAM 12 are then fed to the D/A converter via the interface circuit. The image data are converted to analog video signals by the D/A converter. The image data are fed to the television monitor 20 and displayed as an image.

In the case of audio data, the signal processing processor 8 first performs processing for generating and processing audio data on the basis of a command from the CPU 7. In this case the audio data are processed to convert pitches, add noise, set envelopes, set levels, add reverb, and perform other processing, for example. The audio data are then outputted from the signal processing processor 8 and fed to the D/A converter 15 via the interface circuit 16. The audio data are converted to analog audio signals. The audio data are then outputted from the speaker 13 via the amplification circuit 14 as sound.

Overview of Various Processes in the Game Apparatus

Figure 2:
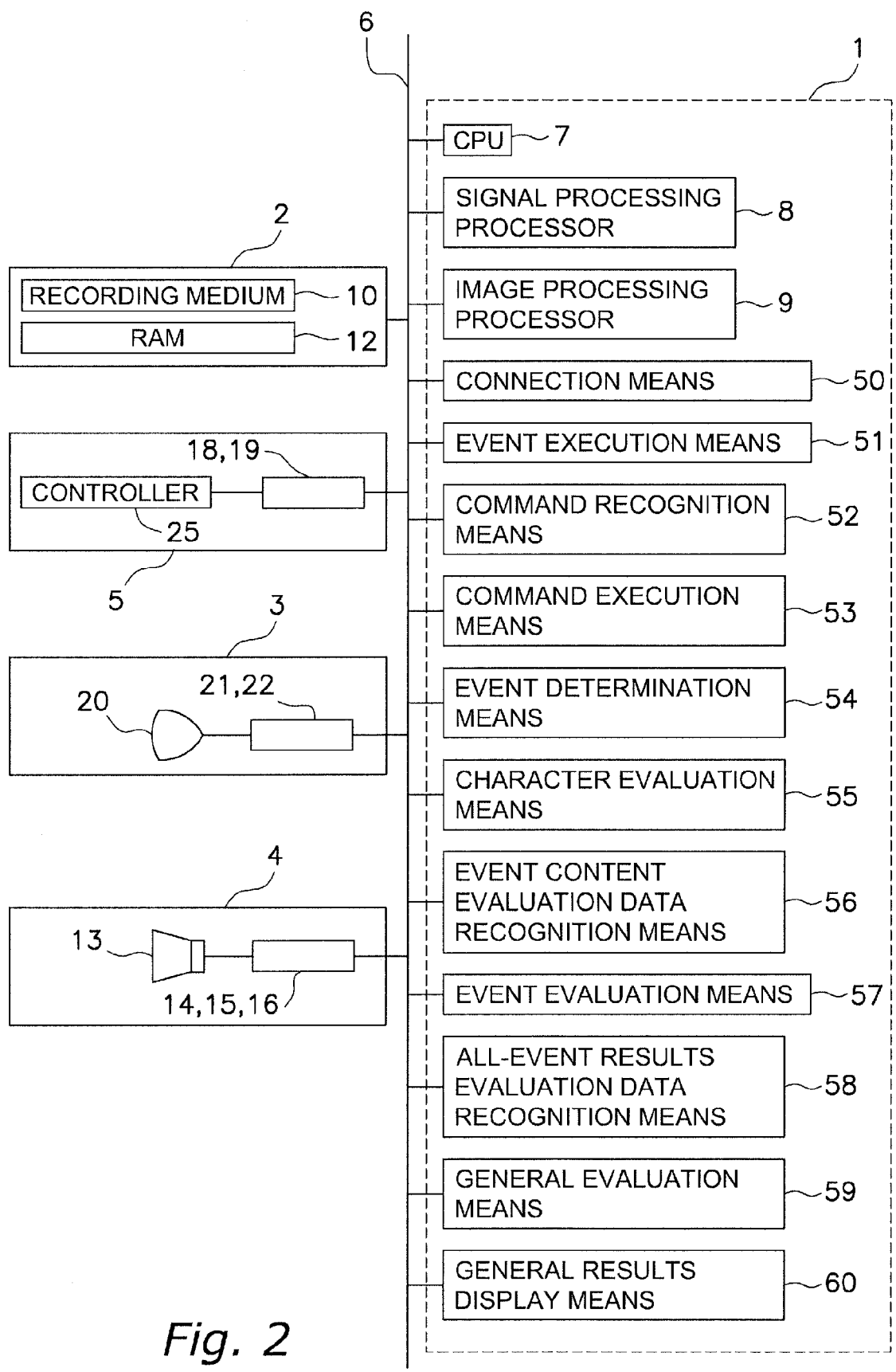
FIG. 2 is a functional block diagram showing the functions of the video game apparatus.

The game implemented in the main game machine is a baseball game, for example. The main game machine is connected to another game machine via a network. A match-type baseball game can be executed in the main game machine and the other game machine. FIG. 2 is a functional block diagram showing the functions that perform principal roles in the present invention.

A connection means 50 is provided with a function for issuing a signal to the CPU 7 of the main game machine for permission to connect to the other game machine when a connection request signal from the other game machine is recognized by the CPU 7 of the main game machine. The connection means 50 is provided with a function for causing the CPU 7 of the main game machine to issue a connection permission signal to the other game machine when the connection request signal from the other game machine is recognized by the CPU 7 of the main game machine.

According to this means, when an operation for requesting a connection to the main game machine is executed in the controller of the other game machine, for example, a connection request signal for requesting a connection to the main game machine via the network is issued from the CPU of the other game machine. When the connection request signal from the other game machine is recognized by the CPU 7 of the main game machine, a connection permission signal for the other game machine is issued from the CPU 7 of the main game machine. The main game machine and the other game machine are then connected to each other via the network.

This means can also be configured so that the connection permission signal for the other game machine is issued from the CPU 7 of the main game machine to a server when the connection request signal from the other game machine is recognized by the CPU 7 of the main game machine. In this case, the main game machine and the other game machine are connected to each other via the server.

An event execution means (event execution device) 51 has a function for causing the CPU to execute an event process that corresponds to an event execution command for executing an event command when the event execution command is issued from the CPU. In the event execution means 51, an event process that corresponds to an event execution command is executed by the CPU when an event execution command for executing an event is issued from the CPU.

According to this means, when the main game machine and the other game machine are connected to each other via the network, for example, event execution commands for executing events relating to the baseball game are issued from the respective CPUs of the main game machine and the other game machine. Event processes that correspond to the event execution commands are then executed by the respective CPUs of the main game machine and the other game machine. For example, processes for executing various types of events such as batting events, pitching events, fielding events, base running events, and the like from the perspective of the main game machine are executed by the respective CPUs of the main game machine and the other game machine.

A command recognition means (command recognition device) 52 is provided with a function for causing the CPU to recognize a command for a character that corresponds to an input operation when a controller is operated to specify a command for a character during execution of an event. In the command recognition means 52, a command for a character that corresponds to an input operation is recognized by the CPU when a controller is operated to specify a command for a character during event execution.

According to this means, when the controller 17 of the main game machine is operated to specify a command for a character during execution of an event, a command for a character that corresponds to the input operation is recognized by the CPU 7 of the main game machine 1. A command for transmitting a signal corresponding to the input operation from the main game machine to the other game machine is then issued to the CPU 7 of the main game machine, whereby the same command as the command for the character recognized by the CPU 7 of the main game machine is recognized by the CPU of the other game machine in the other game machine that is executing the same event as the main game machine.

A command execution means (command execution device) 53 is provided with a function for causing a CPU to execute a command for a character. In the command execution means 53, a command for a character is executed by a CPU.

According to this means, when a command for a character that corresponds to an input operation of the controller 17 of the main game machine is recognized by the CPU 7 of the main game machine 1, for example, the command for the character is executed by the CPU 7 of the main game machine. In the other game machine that is executing the same event as the main game machine, when the same command as the command for the character recognized by the CPU 7 of the main game machine is recognized by the CPU of the other game machine, the command for the character is executed by the CPU of the other game machine. The same command as the command specified for the character in the main game machine is thereby specified for the character of the other game machine.

An event determination means 54 has a function for causing a CPU to determine whether an event is an event to be evaluated. In the event determination means 54, a CPU determines whether an event is an event to be evaluated.

According to this means, the CPU 7 determines whether an event is an event to be evaluated. In this case, events to be evaluated are defined in advance in the game program. For example, when the event of a runner reaching a base is set as an event to be evaluated, the CPU 7 determines whether a runner has reached a base in the event being executed.

A configuration is adopted in which a base flag is used to determine whether a runner has reached a base. For example, when the runner has reached a base, the CPU executes a process for assigning the numerical value "1" to a parameter S that indicates whether a runner has reached a base. When the runner has not reached a base, the CPU executes a process for assigning the numerical value "0" to the parameter S that indicates whether a runner has reached a base. A determination is thus made as to whether a runner has reached a base according to whether the base flag is up, i.e., whether the value of the parameter S is "1" or "0."

A character evaluation means (character evaluation device) 55 has a function for causing a CPU to execute a process for evaluating a character that has executed the action that corresponds to the command recognized by the CPU. Specifically, the character evaluation means 55 is provided with a function for causing a CPU to execute a process for using character evaluation data to evaluate a character that has executed the action that corresponds to the command recognized by the CPU when the CPU determines that an event is an event to be evaluated. In the character evaluation means 55, a CPU executes a process for using character evaluation data to evaluate a character that has executed the action that corresponds to the command recognized by the CPU when the CPU determines that an event is an event to be evaluated.

A case is assumed in which the player operating the main game machine specifies a command to a batter character, for example, and the opposing player operating the other game machine specifies a command for a fielding character according to this means. In this case, when the event is determined by the CPU to be an event to be evaluated in the main game machine, and the player specifies a command relating to hitting for the batter player, a process is executed by the CPU for using character evaluation data for the batter to evaluate the batter character that executed the action corresponding to the command. In the other game machine, when the event is determined by the CPU to be an event to be evaluated, and the opposing player specifies a command relating to pitching for the pitcher character, a process is executed by the CPU for using pitching character evaluation information to evaluate the character for pitching that executed the action corresponding to the command.

The character evaluation data for evaluating each character that correspond to the results of action by each character are defined in advance in the game program. Data items relating to the action of each character, the action results, and the contribution degree, and the relationship thereof to the character evaluation data are defined in a first association table. The first association table is fed from the recording medium to the RAM and stored in the RAM when the game program is loaded in each game machine.

An event content evaluation data recognition means (event content evaluation data recognition device) 56 is provided with a function for causing a CPU to recognize event content evaluation data corresponding to an evaluation of event content by causing the CPU to execute a process for evaluating the content of an event on the basis of the character evaluation data. In the event content evaluation data recognition means 56, a CPU is caused to execute a process for evaluating the content of an event on the basis of character evaluation data, whereby event content evaluation data that correspond to the evaluation of the event content are recognized by the CPU.

According to this means, a process for evaluating the content of an event on the basis of character evaluation data for the batter is executed by the CPU 7 in the main game machine, for example, and event content evaluation data corresponding to the evaluation of the event content are recognized by the CPU 7. In the other game machine, a process for evaluating the content of an event on the basis of character evaluation data for a fielder is executed by the CPU, and event content evaluation data that correspond to the evaluation of the event content are recognized by the CPU.

Specifically, event content evaluation data for evaluating the content of an event are computed by the CPU 7 on the basis of character evaluation data relating to an action, character evaluation data relating to action results, character evaluation data relating to a degree of contribution, and the like. For example, in the main game machine, the CPU 7 executes a process for adding the values of character evaluation data relating to a batter action, character evaluation data relating to batter action results, and character evaluation data relating to a degree of contribution of the batter. The value obtained as a result of addition executed by the CPU 7 is then recognized by the CPU 7 as the value of the event content evaluation data. In the other game machine, the CPU executes a process for adding the values of character evaluation data relating to a pitcher action, character evaluation data relating to pitcher action results, and character evaluation data relating to a degree of contribution of the pitcher. The value obtained as a result of addition executed by the CPU is then recognized by the CPU as the value of the event content evaluation data.

An event evaluation means 57 is provided with a function for causing a CPU to execute a process for evaluating the results of a plurality of events using a event evaluation data for a plurality of the events. In the event evaluation means 57, a process for evaluating the results of a plurality of events using an event evaluation data for a plurality of the events is executed by the CPU.

According to this means, the CPU 7 in the main game machine executes a process for using a event evaluation data for a plurality of the events to evaluate the outcome results that are the results of executing a plurality of events such as hit events, pitching events, fielding events, base running events, and the like of the team for which a player specifies various types of commands. In the same manner, the CPU 7 in the other game machine executes a process for using a event evaluation data for a plurality of the events to evaluate the outcome results that are the results of executing a plurality of events such as hit events, pitching events, fielding events, base running events, and the like of the team for which the opposing player specifies various types of commands.

The event evaluation data for evaluating the results of a plurality of events is defined in advance in the game program. The relationship between the event evaluation data for a plurality of the events and data items relating to the outcomes of matches, rankings in a pennant race, outcomes in the Japan Series, and the like, for example, are defines in a second association table. The second association table is fed from the recording medium to the RAM and stored in the RAM when the game program is loaded in each game machine.

An all-event results evaluation data recognition means 58 is provided with a function for causing a CPU to execute a process for evaluating the results of all events on the basis of a event evaluation data for a plurality of the events, whereby the CPU recognizes all-event results evaluation data that correspond to the evaluation of the results of all events. In the all-event results evaluation data recognition means 58, a CPU executes a process for evaluating the results of all events on the basis of an event evaluation data for a plurality of the events, whereby the CPU recognizes all-event results evaluation data that correspond to the evaluation of the results of all events.

According to this means, the CPU in the main game machine, for example, executes a process for evaluating the results of all events on the basis of a event evaluation data for a plurality of the events of the team for which the player specifies various types of commands, and all-event results evaluation data corresponding to the evaluation of the results of all events are recognized by the CPU. In the other game machine, the CPU executes a process for evaluating the results of all events on the basis of a event evaluation data for a plurality of the events of the team for which the opposing player specifies various types of commands, and all-event results evaluation data corresponding to the evaluation of the results of all events are recognized by the CPU.

Specifically, all-event results evaluation data for evaluating the results of all events are computed by the CPU on the basis of a event evaluation data for a plurality of the events that corresponds to the outcomes of matches, rankings in a pennant race, outcomes in the Japan Series, and the like. For example, in the main game machine, the CPU 7 executes a process for adding the values of a plurality of event evaluation data that corresponds to the outcomes of matches, rankings in a pennant race, and outcomes in the Japan Series of the team for which the player specifies various types of commands. The value obtained as a result of addition executed by the CPU 7 is then recognized by the CPU 7 as the value of the all-event results evaluation data. In the other game machine, the CPU executes a process for adding the values of a plurality of event evaluation data that corresponds to the outcomes of matches, rankings in a pennant race, and outcomes in the Japan Series of the team for which the opposing player specifies various types of commands. The value obtained as a result of addition executed by the CPU is then recognized by the CPU as the value of the all-event results evaluation data.

A general evaluation means 59 is provided with a function for causing a CPU to execute a process for performing a general evaluation of the content of events and the results of all events on the basis of the event content evaluation data and the all-event results evaluation data. In the general evaluation means 59, the CPU executes a process for performing a general evaluation of the content of events and the results of all events on the basis of the event content evaluation data and the all-event results evaluation data.

According to this means, the CPU 7 in the main game machine, for example, executes a process for performing a general evaluation of the content of events and the results of all events on the basis of the event content evaluation data and the all-event results evaluation data recognized by the CPU 7. In the same manner, the CPU in the other game machine executes a process for performing a general evaluation of the content of events and the results of all events on the basis of the event content evaluation data and the all-event results evaluation data recognized by the CPU.

Specifically, in the main game machine, the CPU 7 executes a process for adding the values of the event content evaluation data and the all-event results evaluation data recognized by the CPU 7. The value obtained as a result of addition executed by the CPU 7 is then recognized by the CPU 7 as the value of the general evaluation results data. In the same manner, the CPU in the other game machine executes a process for adding the values of the event content evaluation data and the all-event results evaluation data recognized by the CPU. The value obtained as a result of addition executed by the CPU is then recognized by the CPU as the value of the general evaluation results data.

A general results display means 60 is provided with a function for displaying the results in which the event content and the results of all events are comprehensively evaluated on the basis of the event content evaluation data and the all-event results evaluation data, by using image data that correspond to the results. In the general results display means 60, the results in which the event content and the results of all events are comprehensively evaluated on the basis of the event content evaluation data and the all-event results evaluation data, are displayed on a monitor, by using image data that correspond to the results.

According to this means, an image showing the content of general evaluation results data corresponding to the results of the general evaluation of the event content and the results of all events on the basis of the event content evaluation data and the all-event results evaluation data is displayed in the television monitor 20 using image data, for example. In the main game machine, the CPU 7 can also execute a process for comparing the general evaluation results data of the main game machine with the general evaluation results data of the other game machine, whereby an image showing a relative evaluation of the general evaluation results data of the main game machine and the general evaluation results data of the other game machine is displayed in the television monitor 20. The same image can also be displayed in the television monitor of the other game machine.

Processing Flow and Description of the Game Results Evaluation System in the Baseball Game A case in which a baseball game is executed in a plurality of game machines connected to each other via a network will next be used as an example to describe the specific details of the game results evaluation system in the baseball game. The processing flow of the game results evaluation system shown in FIG. 8 will also be described at the same time. In FIG. 8, communication occurring between the A game machine and the B game machine is indicated by dashed-line arrows.

In the present invention, a plurality of game machines is connected to each other via a network. When a plurality of game machines is connected to each other, the game machines can be connected to each other by various methods. Connection formats can generally be classified according to role and topology. When the connection format is classified by role, the connection format can be classified as a peer-to-peer system in which each of the plurality of game machines is connected in equal standing, a client/server system in which the plurality of game machines (clients) is connected to each other via a server for providing a service, or the like. When the connection format is classified by topology, the connection format can be classified as a bus system in which game machines are directly wired along a single transmission path (bus, bus line), a star system in which game machines are wired in a radial arrangement, a ring system in which game machines are wired in a loop, or the like.

In this case, a plurality of game machines, e.g., two game machines (game machine A and game machine B) are connected to each other in a peer-to-peer/star-type connection format. An example in which two game machines are connected to each other according to this connection format will be described hereinafter.

In the description given hereinafter, player A operating game machine A (the main game machine) specifies commands to the player characters of team A, and player B operating game machine B (the other game machine) specifies commands to the player characters of team B. Game machine A and game machine B both have the same structure as the game apparatus described above. A prime mark (') is added to numbers and symbols relating to game machine B in order to differentiate between game machine A and game machine B.

In a state in which two game machines are connected to a network, when a match-type baseball game program is executed in each game machine on the basis of a command from a CPU, the startup screen of the baseball game is displayed in the television monitor of each game machine (S1, S1'). At this time, a signal indicating that the baseball game has started is issued from each game machine and recognized by the CPU of the other game machine via the network. An authentication process for authenticating the match opponent in each game machine is executed by the CPU of each game machine (S2, S2'). When the process for authenticating the match opponent is completed, a screen for performing various types of initial settings is displayed in the television monitor of each game machine using image data. In this instance, a screen for selecting teams, selecting team members, setting the order, setting the fielding positions, and the like, for example, is displayed in the television monitor of each game machine using image data. When the controller of each game machine is operated in these screens, team selection, team member selection, order setting, field position setting, and the like are executed by the CPU of each came machine (S3, S3'). A command for transmitting data that correspond to initial setting information for each team is then issued from the CPU of each game machine, and the data are recognized by the CPU of the other game machine via the network.

Figure 3:
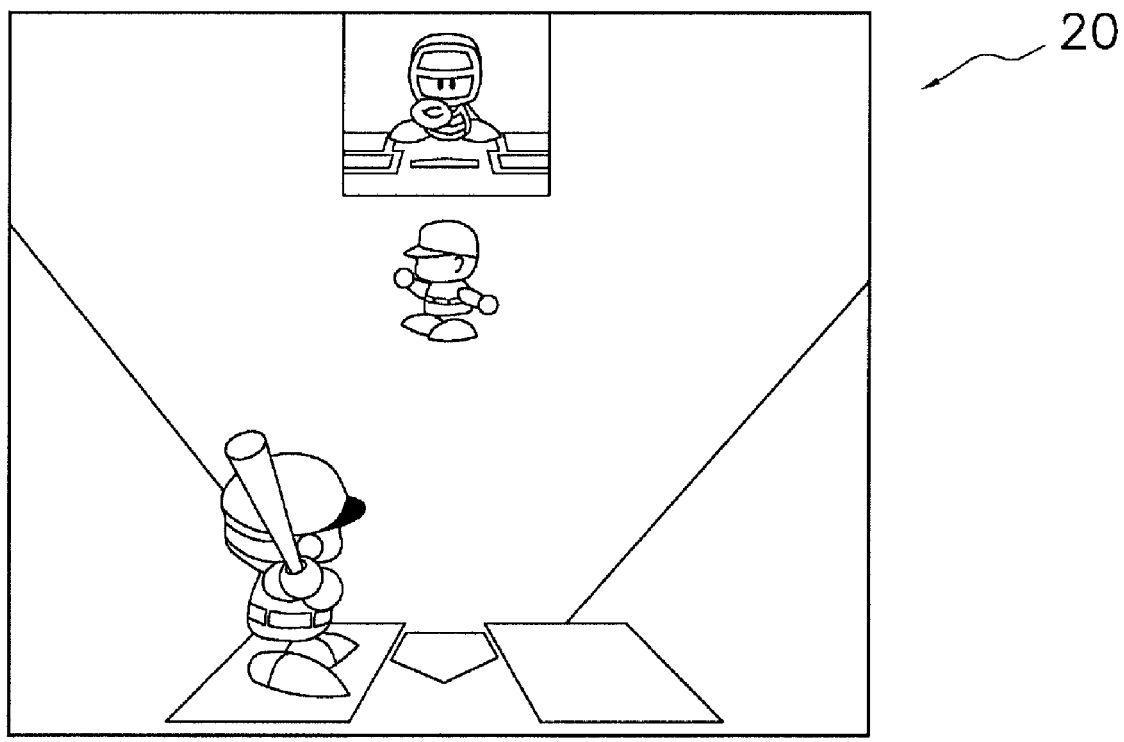
FIG. 3 is a diagram showing the image for the match opening of the baseball game displayed in the television monitor.

When initial setting is executed in this manner in game machine A and game machine B, a match starting command for starting the match in the baseball game is issued from the CPU of each game machine (S4, S4'). Pre-processing for executing the match event in each game machine is then executed by the CPU of each game machine. When the pre-processing is completed, a screen in which the pitcher character and the batter character are standing by for the match is displayed in the television monitor of each game machine using image data stored in the memory unit, e.g., the RAM, of each game machine, as shown in FIG. 3.

When this screen is displayed in the television monitor of each game machine, the CPU of each game machine determines whether the event about to start is an event to be evaluated (S5). For example, the CPU of each game machine determines whether the event about to start in this instance is the event executed in a state in which a runner has reached a base. Specifically, the CPU of each game machine determines whether the base flag is up, i.e., whether the value of the parameter S for the base flag is "1" or "0." A case in which the CPU recognizes a "1" as the value of the parameter S indicates that the runner has reached a base, and a case in which the CPU recognizes a "0" as the value of the parameter S indicates that the runner has not reached a base. The CPU of each game machine executes a process for assigning a prescribed value, e.g., "0," as the initial condition for the parameter S. When a certain event occurs, e.g., a runner reaches a base, the CPU of each game machine executes a process for assigning a prescribed value, e.g., "1," to the parameter S. When the runner is no longer at base, the CPU of each game machine executes a process for assigning a prescribed value, e.g., "0," to the parameter S.

In the following description, player A specifies commands for the batter character, and player B specifies commands for the pitcher character, for example.

A process such as the one described below is executed by the CPUs when the CPU of each game machine determines that the event is an event to be evaluated (S5: YES), e.g., when the CPU of each game machine recognizes the value "1" as the value of the parameter S used for the base flag.

When player B operates the controller to specify the pitch type at the time of the pitch for the pitcher character, pitch type data indicating the pitch type at the time of the pitch are recognized by the CPU of game machine B. When player B operates the controller to initiate the pitching action of the pitcher character, a pitch action initiation command is issued from the CPU of game machine B. A state in which the pitcher character is pitching is then displayed in the television monitor of game machine B using image data for the pitcher character. When player B operates the controller to specify a pitch course for the pitcher character, pitch position data indicating the pitch course at the time of the pitch are recognized by the CPU of game machine B. When player B operates the controller to specify ball release point for the pitcher character, release position data indicating the release point of the ball character are recognized by the CPU of game machine B (S6').

While such types of command instructions to the pitcher character are being executed in game machine B, data relating to the pitcher character, signals for commands, and the like are being transmitted from game machine B to game machine A via the network for each instruction. Therefore, the data, commands, and the like of game machine B are also recognized in game machine A (S6). An example was described in which the data, commands, and the like relating to the pitcher character are transmitted from game machine B to game machine A for each instruction, but a configuration can also be adopted in which the data, commands, and the like are transmitted at once from game machine B to game machine A after the release position data are recognized by the CPU of game machine B.

The trajectory of the ball character that moves from the release position data to the pitch position data while varying an amount that is in accordance with the pitch type data is computed by the CPU of game machine A and game machine B on the basis of a trajectory equation that is defined in advance in the game program. In this arrangement, initial speed data indicating the initial speed of the ball character are used as the initial speed data of the trajectory equation. Data that are defined in advance in the game program for each pitcher character are used as the initial speed data. A state in which the ball character is moving along the trajectory of the ball character is then displayed in the television monitors of game machine A and game machine B using image data for the ball character. In game machine A and game machine B, since the trajectory of the ball character is computed using the same conditions and the same trajectory equation, a ball character moving along the same trajectory is displayed in the television monitors of game machine A and game machine B (S7, S7').

Then, when player A operates the controller to specify the position of the ball contact cursor of the batter character while watching the ball character displayed in the television monitor 20 of game machine A, ball contact position data indicating the positional coordinates of the ball contact cursor are recognized by the CPU 7 of game machine A. The CPU 7 then determines whether player A has operated the controller to initiate the swing of the batter character. In other words, the CPU 7 determines whether a swing initiation command has been issued from the CPU 7 of game machine A. When the swing initiation command has been issued from the CPU 7 of game machine A, a state in which the batter character is swinging is displayed in the television monitor 20 of game machine A using image data for the batter character (S8).

While such various types of commands for the batter character are being executed in game machine A, data, command signals, and the like relating to the batter character are being transmitted from game machine A to game machine B via the network for each instruction. The data, commands, or the like of game machine A are therefore also recognized in game machine B (S8'). An example was described herein in which data, commands, or the like relating to the pitcher character are transmitted from game machine B to game machine A for each instruction, but a configuration can also be adopted in which the data, commands, or the like are transmitted at once from game machine B to game machine A after the swing initiation command is issued from the CPU 7 of game machine A.

The CPUs of game machine A and game machine B determine whether the ball character is captured by the ball contact cursor defined by the ball contact position data (S9, S9'). Specifically, the CPUs of game machine A and game machine B determine whether an overlap region exists between the display region of the ball character and the display region of the ball contact cursor, whose position is defined by the ball contact position data. The determination of the overlap region is performed in game machine A and game machine B according to whether there is a match of at least one point in a plurality of coordinate data within the region of the ball contact cursor and a plurality of coordinate data within the region of the ball character.

When the ball character is captured by the ball contact cursor (S9: YES), a process for evaluating the degree of ball contact is executed by the CPU of game machine A (S10). For example, the CPU of game machine A executes a process for computing the distance between the center position of the ball contact cursor and the center position of the ball character on the basis of ball contact position data, which are coordinate data for defining the center position (the core of the ball contact cursor) of the ball contact cursor, and ball position data, which are coordinate data for defining the center position of the ball character. The CPU of game machine A then determines whether the distance data indicating the distance are less than a prescribed value, e.g., less than 2.0 mm. When the distance data indicating the distance are less than the prescribed value, the ball character is determined to be captured by the core of the ball contact cursor. In this case, for example, the CPU of game machine A executes a process for assigning the numerical value "10" to the ball contact evaluation data M, which are data for evaluating the degree of ball contact, on the basis of the association table shown in FIG. 4. When the distance data indicating the distance are equal to or above a prescribed value, e.g., equal to or above 2.0 mm, although the ball character can be captured by the ball contact cursor, the ball character is determined to not be captured by the core of the ball contact cursor. In this case, the CPU of game machine A executes a process for assigning the numerical value "5" to the ball contact evaluation data M, for example.

The trajectory of the ball character hit by the batter character is then computed by the CPU of game machine A on the basis of the trajectory equation defined in advance in the game program (S11). A state in which the ball character moves along the trajectory of the ball character is then displayed in the television monitor of game machine A using image data for the ball character. In this arrangement, synthesized vector data of the ball calculated by synthesizing the speed vector of the ball and the speed vector of the bat at the time of ball contact are used as the initial speed data in the trajectory equation.

The CPU of game machine A then executes a process for evaluating the results after the hitting action of the batter character that has hit the ball (S12). For example, the CPU of game machine A recognizes that the result of the ball character being hit by the batter character is any of an out, a hit, a double, a triple, a home run, or the like. Specifically, the result is determined using a result parameter K. For example, the CPU of game machine A executes a process for assigning the numerical value "1" to the result parameter K in the case of an out, a "2" to the result parameter K in the case of a hit, a "3" to the result parameter K in the case of a double, a "4" to the result parameter K in the case of a triple, or a "5" to the result parameter K in the case of a home run. By recognizing such values assigned to the result parameter K, the CPU of game machine A manages the results after hitting by the batter character that hit the ball. When the result of the ball character being hit by the batter character is thus recognized by the CPU of game machine A, the CPU of game machine A executes a process for assigning a prescribed value to action result evaluation data D, which are data for evaluating the result after the hit action according to each result, on the basis of the association table shown in FIG. 4. The result after the hitting action of the batter character that hit the ball is also evaluated based on this numerical value.

The CPU 7 of game machine A then executes a process for evaluating the degree of contribution of the batter character to the team (S13). For example, the CPU of game machine A recognizes that an RBI gained by the batter character is an RBI having any content among the group that includes an RBI whereby the batter's team is tied with the opposing team, an RBI whereby the batter's own team is above 0.500, an RBI whereby the batter's team wins in a walk-off, or the like. This result is determined using an RBI content parameter N. For example, the CPU of game machine A executes a process for assigning the value "1" to the RBI content parameter N in the case of an RBI whereby the batter's team is tied with the opposing team, the value "2" to the RBI content parameter N in the case of an RBI whereby the batter's own team is above 0.500, and the value "3" to the RBI content parameter N in the case of an RBI whereby the batter's team wins in a walk-off. The CPU of game machine A manages the content when the batter character gains an RBI by recognizing such values assigned to the RBI content parameter N. When the content of an RBI gained by the batter character is recognized by the CPU of game machine A in this manner, the CPU of game machine A executes a process for assigning a prescribed value to contribution degree evaluation data H, which are data for evaluating the contribution of the batter character to the team according to each content, on the basis of the association table shown in FIG. 4. The degree of contribution of the batter character to the team is thus evaluated based on a numerical value.

When the ball character is not captured by the ball contact cursor (S9: NO), batter character has let the pitch go by or has swung and missed, and the CPU of game machine A executes a process for assigning the value "0" to the ball contact evaluation data M (S14). The CPU of game machine A then executes a process for evaluating the result after the hitting action of the batter character who has let the pitch go by or has swung and missed (S15). For example, the CPU of game machine A recognizes that the result of the batter character swinging and missing was a mere swing and miss, or a strikeout due to a missed swing. Specifically, the CPU of game machine A executes a process for assigning the value "6" to the result parameter K in the case of a mere missed swing, and the value of "7" to the result parameter K in the case of a strikeout due to a missed swing. The CPU of game machine A manages the results after the hitting action of the batter character who has swung and missed by recognizing such numerical values assigned to the result parameter K. When the result of a missed swing by the batter character is thus recognized by the CPU of game machine A, the CPU of game machine A executes a process for assigning a prescribed value to action result evaluation data D, which are data for evaluating the result after the hitting action according to each result, on the basis of the association table shown in FIG. 4. The result after the hitting action of the batter character that swung and missed is thus evaluated based on a numerical value. Data corresponding to the result of the batter character letting a pitch go by are not shown in FIG. 4, but the value "0" is assigned to the action result evaluation data D in this case.

Baseball events, e.g., batting events from the perspective of game machine A (pitching events from the perspective of game machine B) are thus executed by the CPU of each game machine. When baseball events are executed by the CPU of each game machine in this manner, and a command for a player character is specified from a controller, a command for the character that corresponds to the input action is recognized and executed by a CPU. Various types of instructions, e.g., hitting-related instructions, pitching-related instructions, and the like, can thus be issued to the player characters.

The abovementioned ball contact evaluation data M, action result evaluation data D, and contribution degree evaluation data H correspond to batter character evaluation data. These items of evaluation data are accumulated each time an evaluation is performed.

The evaluation relating to the batter character in game machine A described above is not executed in game machine B. However, an evaluation relating to the pitcher character is executed in game machine B. Specifically, processes for computing evaluation data relating to a character are executed only for the character for which a command was issued. In this arrangement, evaluations relating to the batter character are performed in game machine A, and evaluations relating to the pitcher character are performed in game machine B. The commands for the characters for which the evaluations are performed, the data relating to the characters, and the like are the same in game machine A and game machine B.

The processes executed in game machine B relating to evaluation of the pitcher character will next be described.

In game machine B, the CPU of game machine B determines whether the ball character is captured by the ball contact cursor of the batter character, in the same manner as in game machine A (S9').

When the ball character is not captured by the ball contact cursor of the batter character (S9': NO), the CPU of game machine B executes a process for evaluating the speed, course, or the like of the ball (S13'). For example, the CPU determines whether the ball speed is 140 km/h or higher. When the ball speed is 140 km/h or higher, the CPU executes a process for assigning the value "5" to ball speed evaluation data S, which are data for evaluating the speed of the ball. When the ball speed is less than 140 km/h, the CPU executes a process for assigning the value "2" to the ball speed evaluation data S. The CPU also determines whether the course is a strike, for example. When the course is a strike, the CPU executes a process for assigning the value "5" to course evaluation data B, which are data for evaluating the course of the ball. When the course is not a strike, i.e., when the course is a ball, the CPU executes a process for assigning the value "−2" to the course evaluation data B.

When the ball character is not captured by the ball contact cursor (S9': NO), the pitcher character has caused the batter character to swing and miss, or the batter character has allowed the ball to go by. When the pitcher character has caused the batter character to swing and miss, the CPU executes a process for evaluating the result after the pitching action of the pitcher character (S14'). In this case, the CPU recognizes whether this result is a mere missed swing or a strikeout caused by a missed swing, for example. Specifically, the CPU executes a process for assigning the value "16" to the result parameter K in the case of a mere missed swing, or the value "17" to the result parameter K in the case of a strikeout due to a missed swing. The CPU of game machine B recognizes such values assigned to the result parameter K, and thereby manages the result after the pitching action of the pitcher character that causes the batter character to swing and miss. When the result after the pitching action of the pitcher character that causes the batter character to swing and miss is thus recognized by the CPU, the CPU executes a process for assigning a prescribed value to the action result evaluation data D, which are data for evaluating the result after the pitching action according to each result, on the basis of the association table shown in FIG. 5. The result after the hitting action of the batter character that swung and missed is evaluated based on this numerical value. Data corresponding to the result of the batter character letting a pitch go by are not shown in FIG. 5, but the value "0" is assigned to the action result evaluation data D in this case.

The CPU 7 then executes a process for evaluating the degree of contribution of the pitcher character to the team (S15'). For example, the CPU recognizes whether the pitcher character has allowed a run. Specifically, a pitcher runs-allowed parameter W is used to determine whether the pitcher character has allowed a run. For example, the CPU executes a process for assigning the value "1" to the pitcher runs-allowed parameter W when the pitcher character has allowed a run, and the value "2" to the pitcher runs-allowed parameter W when the pitcher character has not allowed a run. The CPU manages the runs-allowed content of the pitcher character by recognizing such numerical values assigned to the pitcher runs-allowed parameter W. When the runs-allowed content of the pitcher character is thus recognized by the CPU, the CPU executes a process for assigning a prescribed value to the contribution degree evaluation data H, which are data for evaluating the degree of contribution of the pitcher character to the team according to each content, on the basis of the association table shown in FIG. 5. The degree of contribution of the pitcher character to the team is evaluated based on this numerical value.

When the ball character is captured by the ball contact cursor (S9': YES), the batter character of team A has scored a hit on the pitcher character of team B operated by player B. In this case, the CPU executes a process for assigning the value "0" to the ball speed evaluation data S and the course evaluation data B (S10'). The trajectory of the ball character hit by the batter character is computed by the CPU of game machine B on the basis of a trajectory equation defined in advance in the game program (S11'). A state in which the ball character moves along the trajectory of the ball character is then displayed in the television monitor of game machine B using image data for the ball character. In this arrangement, synthesized vector data of the ball calculated by synthesizing the speed vector of the ball and the speed vector of the bat at the time of ball contact are used as the initial speed data in the trajectory equation.

The CPU then executes a process for evaluating the result after the pitching action of the pitcher character whose pitch was hit by the batter character (S12'). The CPU of game machine B recognizes the result after the pitching action of the pitcher character whose pitch was hit by the batter character as any of an out, a hit, a double, a triple, a home run, or the like. This result is determined using the result parameter K. For example, the CPU of game machine B executes a process for assigning the value "11" to the result parameter K in the case of an out, the value "12" to the result parameter K in the case of a hit, the value "13" to the result parameter K in the case of a double, the value "14" to the result parameter K in the case of a triple, or the value "15" to the result parameter K in the case of a home run. The CPU of game machine B manages the result after the pitching action of the pitcher character whose pitch was hit by the batter character by recognizing such values assigned to the result parameter K. When the CPU of game machine B recognizes the result after the pitching action of the pitcher character whose pitch was hit by the batter character, the CPU of game machine B executes a process for assigning a prescribed value to the action result evaluation data D, which are data for evaluating the result after the pitching action according to each result, on the basis of the association table shown in FIG. 5. The result after the pitching action of the pitcher character whose pitch was hit by the batter character is evaluated based on this numerical value.

As described above, the CPU 7 then executes a process for evaluating the degree of contribution of the pitcher character to the team (S15'). For example, the CPU recognizes whether the pitcher character has allowed a run. The CPU executes a process for assigning a prescribed value to the contribution degree evaluation data H, which are data for evaluating the degree of contribution of the pitcher character to the team, according to whether the pitcher character allowed a run (see FIG. 5).

Baseball events, e.g., pitching events from the perspective of game machine B (batting events from the perspective of game machine A) are thus executed by the CPU of each game machine. When baseball events are executed by the CPU of each game machine in this manner, and a command for a player character is specified from a controller, a command for the character that corresponds to the input action is recognized and executed by a CPU. Various types of instructions, e.g., hitting-related instructions, pitching-related instructions, and the like, can thus be issued to the player characters.

The abovementioned ball speed evaluation data S, course evaluation data B, action result evaluation data D, and contribution degree evaluation data H correspond to pitcher character evaluation data. These items of evaluation data are accumulated each time an evaluation is performed.

The evaluation relating to the pitcher character in game machine B described above is not executed in game machine A. However, an evaluation relating to the batter character is executed in game machine A. Specifically, processes for computing evaluation data relating to a character are executed only for the character for which a command was issued. In this arrangement, evaluations relating to the batter character are performed in game machine A, and evaluations relating to the pitcher character are performed in game machine B. The commands for the characters for which the evaluations are performed, the data relating to the characters, and the like are the same in game machine A and game machine B.

When the CPU of each game machine determines that an event is not an event to be evaluated (S5: NO), e.g., when the CPU of each game machine recognizes the value "0" as the value of the parameter S used for the base flag, the CPU of each game machine does not execute the process described above for executing an evaluation relating to any one of the batter character and the pitcher character in each game machine. Specifically, in this case, the processes other than those relating to evaluation (the processes from S6 to S16 except for S10, S12, S13, S14, and S15; and the processes from S6' to S16' except for S10', S12', S14', S15', and S16') are executed by the CPU of each game machine.

A determination is then made as to whether a batting and fielding exchange command (change command) indicating an exchange of batting and fielding has been issued from the CPU of game machine A (S16). When a change command has been issued by the CPU of game machine A (S16: YES), the same processes as the processes from step 5 to step 15' described in game machine B are executed by the CPU of game machine A (S17). These processes are executed in the apparatuses that constitute game machine A. Specifically, when offense by team A is completed, an evaluation of team A during defense is performed (evaluation of the pitcher character). When the change command has not been issued by the CPU of game machine A (S16: NO), step 5 (S5) is re-executed. Specifically, when offense by team A continues, the evaluation of team A during offense (evaluation of the batting character) continues.

The determination as to whether the change command has been issued is executed in the CPU of game machine B as well (S16'). When the change command has been issued by the CPU of game machine B (S16': YES), the same processes as the processes from step 5 to step 15 executed in game machine A are executed by the CPU of game machine B. These processes are executed in the apparatuses that constitute game machine B. Specifically, when defense by team B is completed, an evaluation of team B during offense is performed (evaluation of the batter character). When the change command has not been issued by the CPU of game machine B (S16': NO), step 5' (S5') is re-executed. Specifically, when defense by team B continues, the evaluation of team B during defense (evaluation of the pitching character) continues.

The abovementioned processes are repeatedly executed by the CPU of each game machine until the match event is completed (S18, S18').

The CPU of each game machine then determines whether the match event is completed (S19, S19'). Specifically, the CPU of each game machine determines whether a match completion command for ending the match event has been issued. When the match completion command has been issued (S19: YES; S19'; YES), the CPU of each game machine executes a process for ending the match event.

In each game machine, the CPU executes a process for evaluating the content of events during offense on the basis of offense evaluation data evaluated through one match, e.g., the ball contact evaluation data M, the action result evaluation data D, and the contribution degree evaluation data H (S20, S20'). For example, the CPU executes a process for adding the values of the ball contact evaluation data M, the action result evaluation data D, and the contribution degree evaluation data H, whereby offense event content evaluation data I are computed, which are data for evaluating the event content during offense, and the event content evaluation data I are recognized by the CPU.

In each game machine, the CPU executes a process for evaluating the content of events during pitching on the basis of pitching evaluation data evaluated through one match, e.g., the ball speed evaluation data S, the course evaluation data B, the action result evaluation data D, and the contribution degree evaluation data H. For example, the CPU executes a process for adding the values of the ball speed evaluation data S, the course evaluation data B, the action result evaluation data D, and the contribution degree evaluation data H, whereby pitching event content evaluation data I are computed, which are data for evaluating the event content during pitching, and the event content evaluation data I are recognized by the CPU.

The CPU of each game machine then executes a process for evaluating the content of events through a single match on the basis of the event content evaluation data I for pitching, and the event content evaluation data I for batting. For example, the CPU of each game machine executes a process for adding the event content evaluation data I for pitching, and the event content evaluation data I for batting, whereby the event content evaluation data I are computed, which are data for evaluating the content of events through a single match. These event content evaluation data I are stored in the RAM of each game machine and recognized by the CPU of each game machine.

The CPU of each game machine then determines whether a pennant race is completed (S21, S21'). Specifically, the CPU of each game machine determines whether a pennant completion command for ending the pennant race has been issued. When the pennant completion command has been issued (S21: YES; S21': YES), the CPU of each game machine executes a process for ending the pennant race.

In this arrangement, event content evaluation data I in which the content of all matches of team A is evaluated is recognized by the CPU on the basis of each set of event content evaluation data I of all the matches of team A in the pennant race (S22, S22'). For example, the CPU executes a process for adding each set of event content evaluation data I for all matches of team A in the pennant race, whereby event content evaluation data I is computed in which the content of all the matches of team A are evaluated. This process is also executed for each of all the matches of team B in the pennant race, and the CPU recognizes event content evaluation data I in which the content of all the matches of team B is evaluated at the time of pennant race completion.

The CPU in each game machine then executes a process for evaluating the results of all the matches performed in the pennant race, i.e., the results of the pennant race (S23, S23'). For example, the results of the pennant race are determined using a pennant result parameter P. For example, when a pennant race is won, the CPU executes a process for assigning the value "1" to the pennant result parameter P in the case of a pennant race win, and a value (integer from "2" to "6") corresponding to the rank to the pennant result parameter P in the case of any rank from $2^{nd}$ to $6^{th}$ in the pennant race. The CPU manages the results of the pennant race by recognizing such numerical values assigned to the pennant result parameter P.

Figures 6, 7:
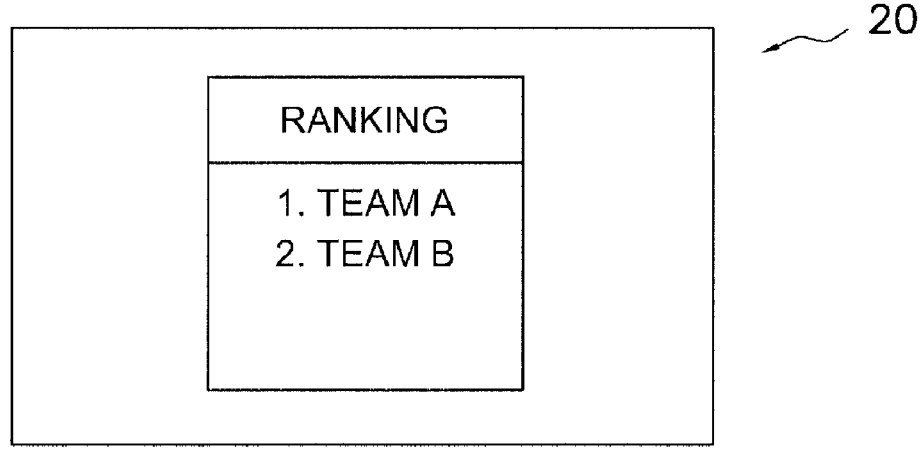
FIG. 6 is a diagram showing an association table for evaluating a pennant race.
FIG. 7 is a diagram showing the ranking of each game displayed in the television monitor.
Figure 8A:
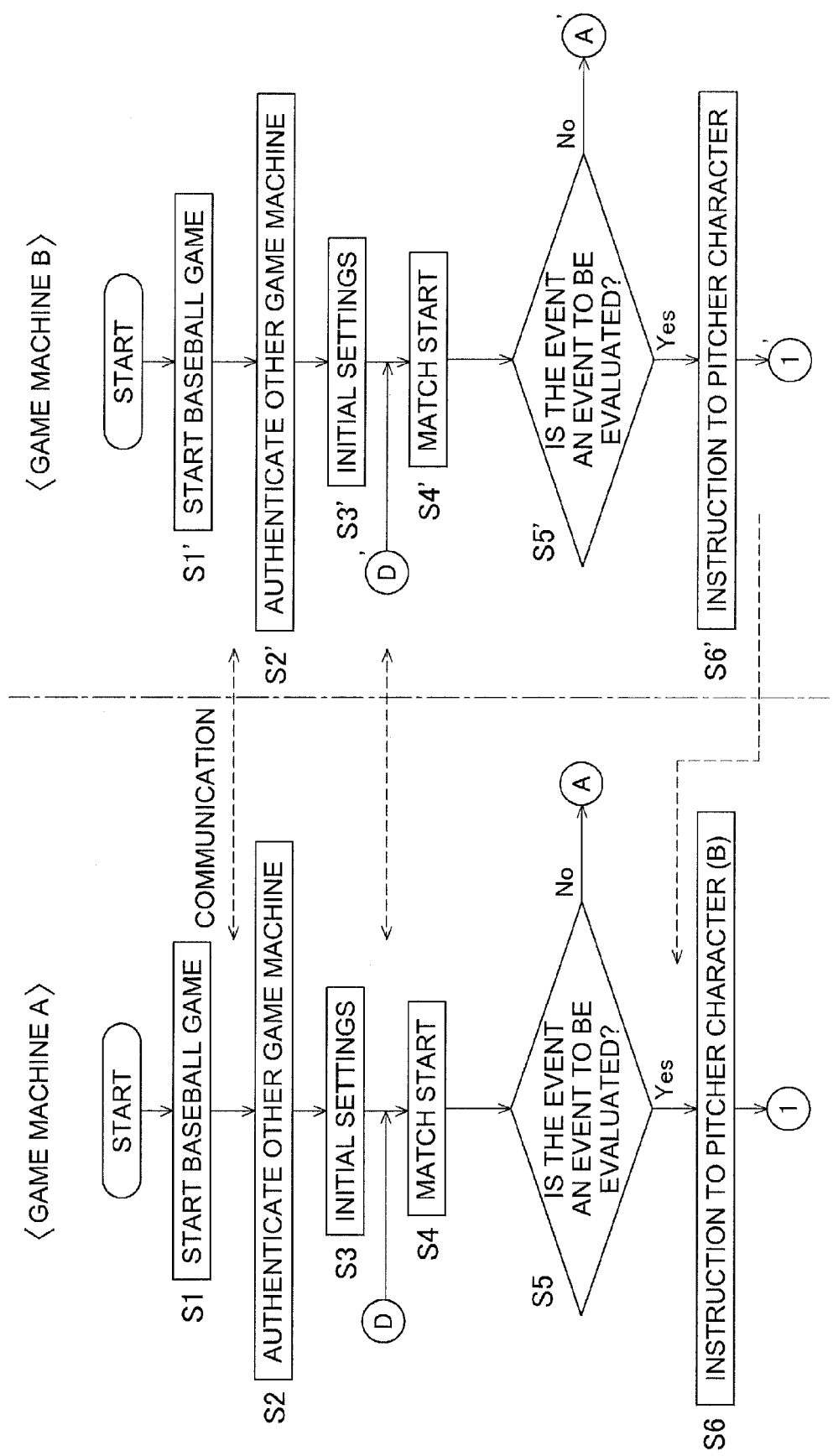
FIG. 8A is a flowchart showing the game results evaluation system.
Figure 8B:
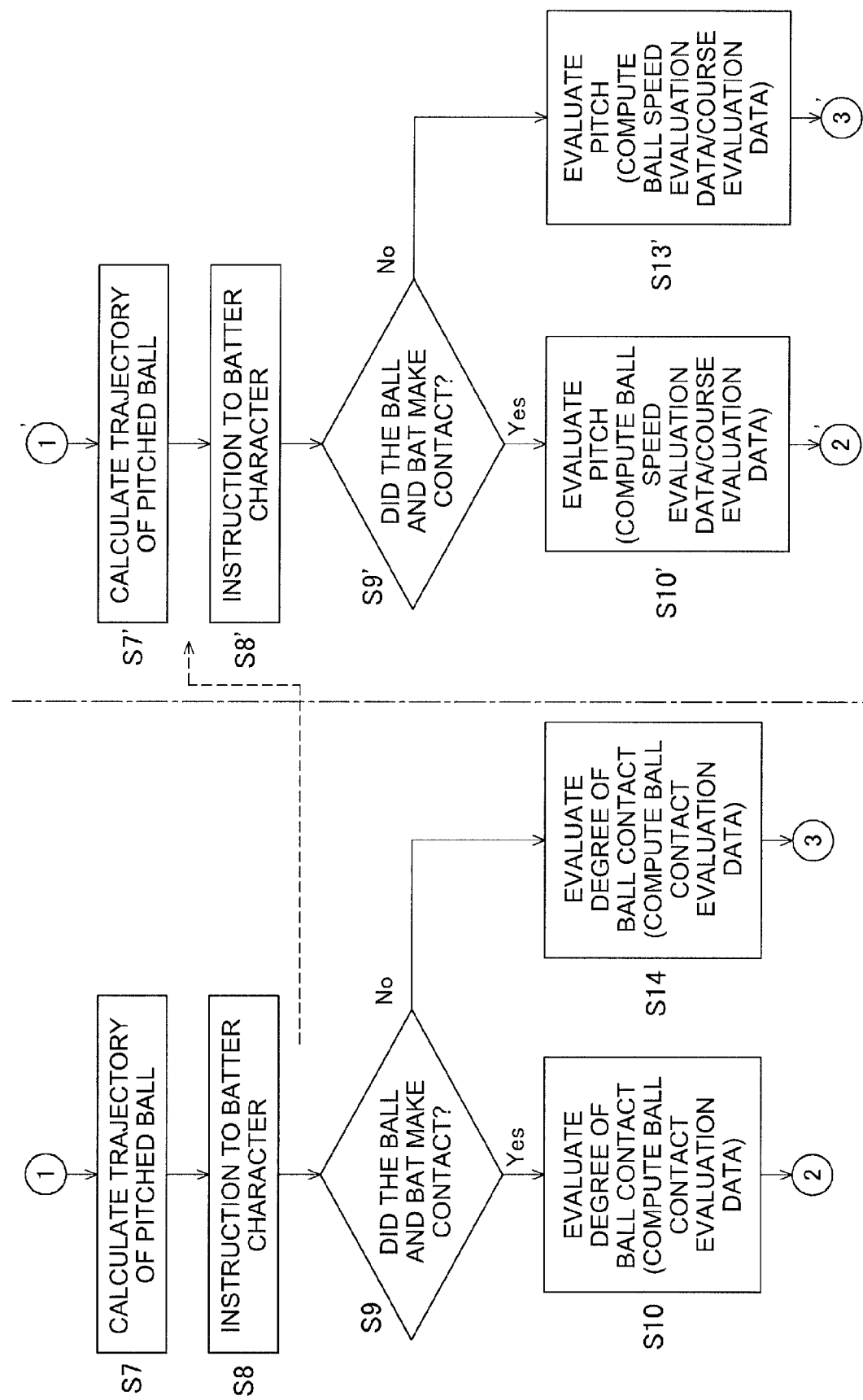
FIG. 8B is a flowchart showing the game results evaluation system.
Figure 8C:
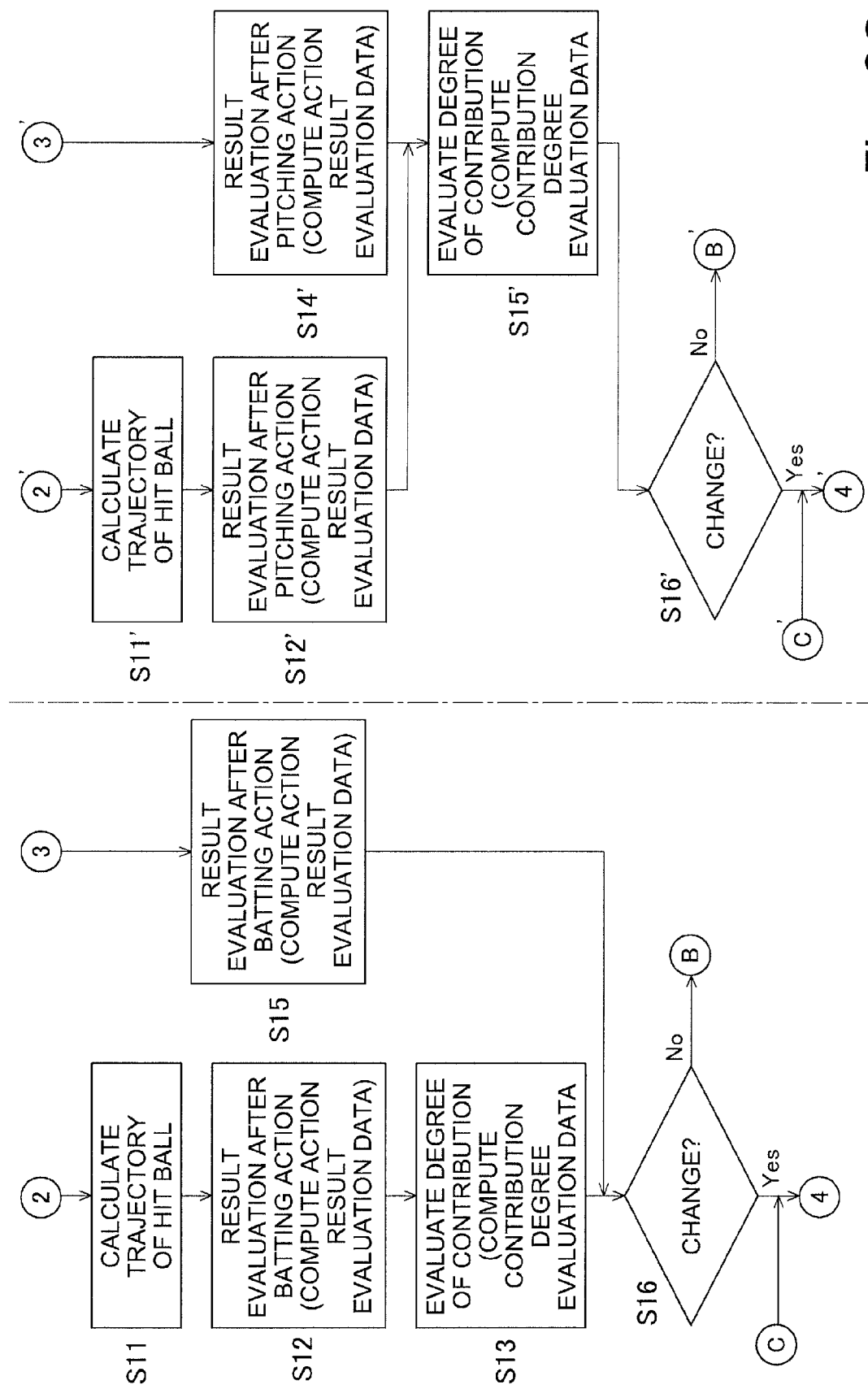
FIG. 8C is a flowchart showing the game results evaluation system.
Figure 8D:
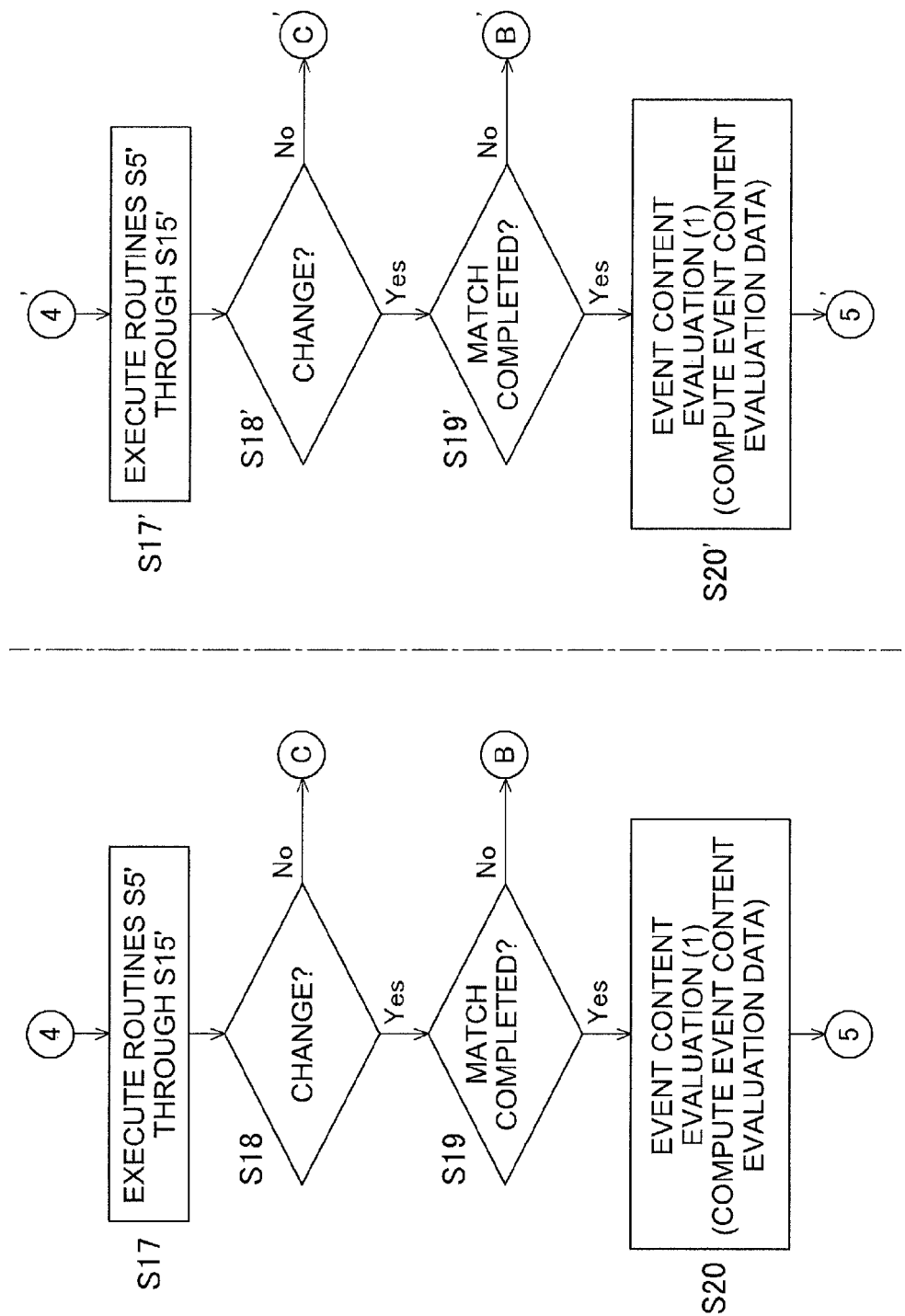
FIG. 8D is a flowchart showing the game results evaluation system.
Figure 8E:
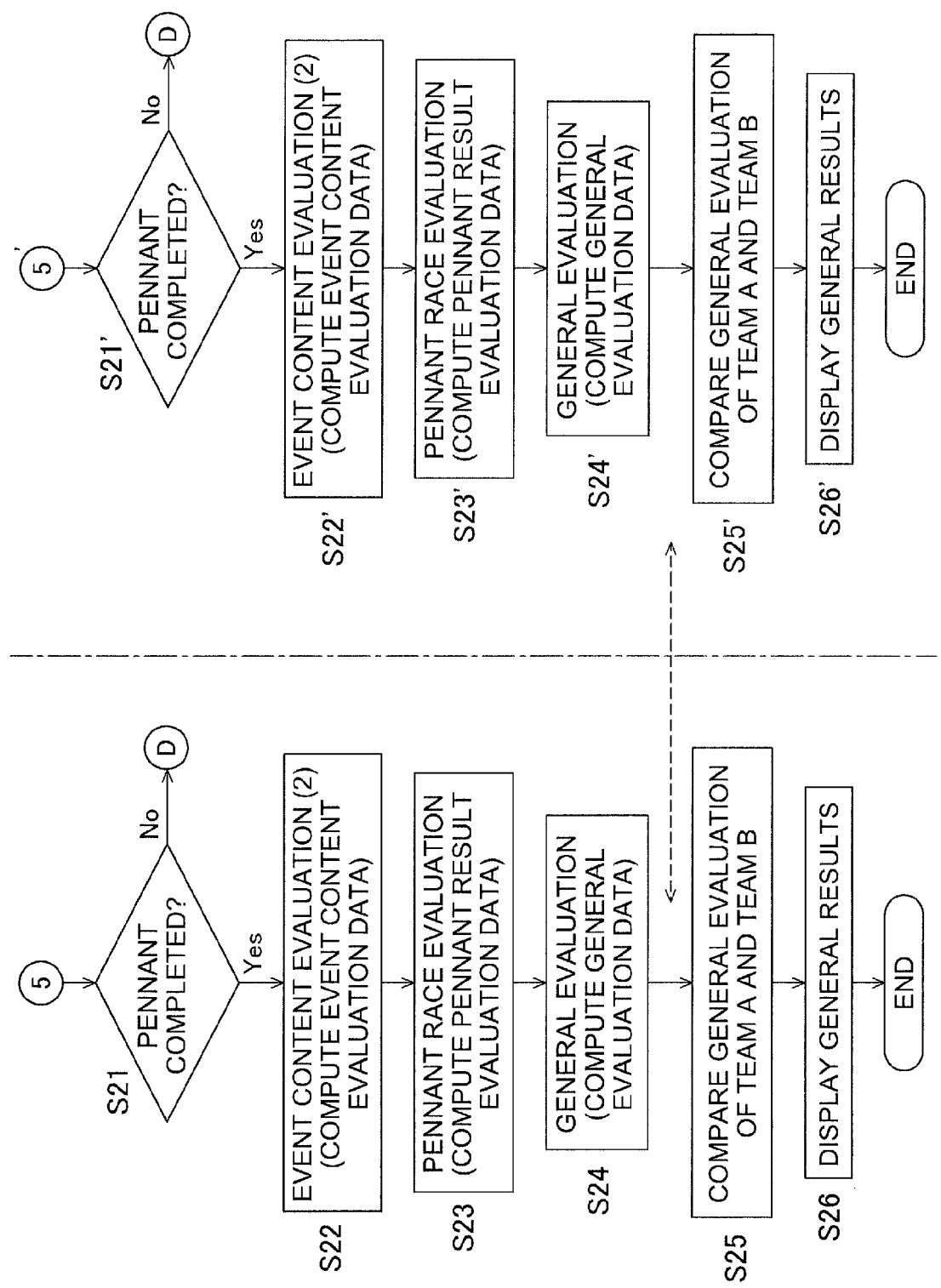
FIG. 8E is a flowchart showing the game results evaluation system.

When the result of the pennant race is thus recognized by the CPU, the CPU executes a process for assigning a prescribed value to the pennant result evaluation data P, which are data for evaluating the result of the pennant race according to each result, on the basis of the association table shown in FIG. 6. The results of the pennant race are evaluated on the basis of this numerical value. This process is executed for team B after completion of the pennant race in game machine B, and the result of the pennant race of team B is evaluated in game machine B when the pennant race is completed. The pennant result evaluation data P described above corresponds to the all-event results evaluation data.

The CPU in game machine A then executes a process for performing a general evaluation of the event content and the pennant race result on the basis of the event content evaluation data I and the pennant result evaluation data P (S24). For example, the CPU executes a process for adding the event content evaluation data I and the pennant result evaluation data P, whereby the addition result is recognized by the CPU as general evaluation data T for team A. This process is also executed for team B in game machine B, and the event content and the result of the pennant race of team B are comprehensively evaluated when the pennant race is completed. The CPU in game machine B thereby recognizes the general evaluation data T for team B.

The general evaluation data T for team A are then transmitted from game machine A to game machine B, and the general evaluation data T for team B are transmitted from game machine B to game machine A. In game machine A that receives the general evaluation data T for team B, the CPU executes a process for numerically comparing the general result of team A and the general result of team B on the basis of the general evaluation data T for team A and the general evaluation data T for team B (S25, S25'). A command for generating image data for displaying a comparison of the general data, e.g., a ranking table, is then issued from the CPU according to the comparison result. A comparison of the general result, e.g., a ranking table, is then displayed in the television monitor of each game machine using image data for the ranking table, as shown in FIG. 7 (S26, S26').

An example was described herein of a case in which two game machines were connected via a network, and the ranking table in FIG. 7 therefore shows the comparison results for team A and team B. However, in a case in which a plurality of game machines is connected via a network, for example, the comparison results of a plurality of teams are shown in the ranking table.

A process (S19) for determining whether the match event is completed was performed after the process of step 18 in order to simplify the description given above. However, in an actual baseball game, this determination process (S19) is also executed after the process of step 16.

In the embodiment described above, the various types of means are described with respect to batting events and pitching events. However, the various types of means in the present invention can be applied in the same manner not only for batting events and pitching events, but also for such events as fielding events, base running events, and the like. In this instance, it is also necessary to prepare a table for fielding events and a table for base running events, for example.

Other Embodiments (a) In the aforementioned embodiment, a home video game apparatus was used as an example of a computer to which the game program can be applied, but the game apparatus is not limited to the embodiment described above. The present invention can also be applied in the same manner to a game apparatus in which the monitor is provided separately, a game apparatus in which the monitor is integrated, a personal computer or workstation for functioning as the game apparatus by executing the game program, or the like.

(b) The present invention also includes a program for executing a game such as the one described above, and a computer-readable recording medium in which the program is stored. Examples of the recording medium other than a cartridge include computer-readable flexible disks, semiconductor memory, CD-ROM, DVD, MO, ROM cassettes and other media.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A computer-readable medium storing a game program for executing a game on a first computer, the program comprising:

code for recognizing a first event execution command, the first event execution command being issued from a control unit;

code for executing a first event that corresponds to the first event execution command;

code for evaluating a character which receives a command in the first event, and generating first character evaluation data corresponding to an evaluation for the character;

code for evaluating a first content of the first event on the basis of the first character evaluation data, and generating first event content evaluation data corresponding to an evaluation of the first content;

code for recognizing the first event content evaluation data;

code for evaluating a result of the first event, and generating event result data corresponding to an evaluation of the result;

code for recognizing a second event execution command, the second event execution command being issued from the control unit;

code for executing a second event that corresponds to the second event execution command;

code for evaluating the character which receives a command in the second event, and generating second character evaluation data corresponding to an evaluation for the character;

code for evaluating a second content of the second event on the basis of the second character evaluation data, and generating second event content evaluation data corresponding to an evaluation of the second content of the second event;

code for recognizing the second event content evaluation data;

code for evaluating a first result of the first event and a second result of the second event, and generating all-event result evaluation data that correspond to an evaluation of the first and second results; and code for comprehensively evaluating the first and second contents and the first and second results on the basis of the first and second event content evaluation data and the all-event result evaluation data, the second character evaluation data being selected from predetermined values corresponding to an action if the character performs the action in the second event, a result if the character obtains the result in the second event, and a contribution if the character has the contribution in the second event.

2. The computer-readable medium storing the game program as recited in claim 1, the program further comprising code for determining whether or not at least one of the first event and the second event is appropriate to be evaluated.

3. The computer-readable medium storing the game program as recited in claim 2, wherein when at least one of the first event and the second event is determined to be appropriate to be evaluated, the control unit evaluates the character on the basis of the character evaluation data.

4. The computer-readable medium storing the game program as recited in claim 1, the program further comprising code for displaying on a monitor an image that corresponds to the all-event result evaluation data.

5. The computer-readable medium storing the game program as recited in claim 1, the program further comprising code for transmitting a signal corresponding to the command for the character from the first computer to a second computer, wherein the command is recognized by a second control unit of the second computer, and the command is executed by the second control unit that executes the first event.

6. A game device for executing a game, comprising:

a command recognition device configured to recognize a event execution command, the event execution command being issued from a control unit;

an event execution device configured to execute a event that corresponds to the event execution command;

a character evaluation device configured to evaluate a character which receives a command in the event, and generating character evaluation data corresponding to an evaluation for the character;

an event content evaluation data recognition device configured to evaluate a content of the event on the basis of the character evaluation data, to generate event content evaluation data corresponding to an evaluation of the content; and to recognize the event content evaluation data;

an even result evaluation device configured to evaluate a result of the first event, and generate event result data corresponding to an evaluation of the result;

a second event execution command recognition device configured to recognize a second event execution command, the second event execution command being issued from the control unit;

a second event execution device configured to execute a second event that corresponds to the second event execution command;

a character evaluation device configured to evaluate the character which receives a command in the second event, and generate second character evaluation data corresponding to an evaluation for the character;

a second content evaluation device configured to evaluate a second content of the second event on the basis of the second character evaluation data, and generate second event content evaluation data corresponding to an evaluation of the second content of the second event;

a second event content evaluation recognition device configured to recognize the second event content evaluation data;

a result evaluation device configured to evaluate a first result of the first event and a second result of the second event, and generate all-event result evaluation data that correspond to an evaluation of the first and second results; and a content-and-result evaluation device configured to comprehensively evaluate the first and second contents and the first and second results on the basis of the first and second event content evaluation data and the all-event result evaluation data, the second character evaluation data being selected from predetermined values corresponding to an action if the character performs the action in the second event, a result if the character obtains the result in the second event, and a contribution if the character has the contribution in the second event.

7. A game control method for controlling a game, comprising:

preparing a computer on which a game is executed, the computer having a control unit;

recognizing a event execution command, the event execution command being issued from a control unit;

executing a event that corresponds to the event execution command;

evaluating a character which receives a command in the event, and generating character evaluation data corresponding to an evaluation for the character;

evaluating a content of the event on the basis of the character evaluation data, and generating event content evaluation data corresponding to an evaluation of the content; and recognizing the event content evaluation data;

evaluating a result of the first event, and generating event result data corresponding to an evaluation of the result;

recognizing a second event execution command, the second event execution command being issued from the control unit;

executing a second event that corresponds to the second event execution command;

evaluating the character which receives a command in the second event, and generating second character evaluation data corresponding to an evaluation for the character;

evaluating a second content of the second event on the basis of the second character evaluation data, and generating second event content evaluation data corresponding to an evaluation of the second content of the second event;

recognizing the second event content evaluation data;

evaluating a first result of the first event and a second result of the second event, and generating all-event result evaluation data that correspond to an evaluation of the first and second results; and evaluating comprehensively the first and second contents and the first and second results on the basis of the first and second event content evaluation data and the all-event result evaluation data, the second character evaluation data being selected from predetermined values corresponding to an action if the character performs the action in the second event, a result if the character obtains the result in the second event, and a contribution if the character has the contribution in the second event.

* * * * *